United States Patent

[11] 3,614,058

| [72] | Inventor | Phillip L. Crisp |
| | | 624 Lail St., Marion, N.C. 28752 |
| [21] | Appl. No. | 68,636 |
| [22] | Filed | Sept. 1, 1970 |
| [45] | Patented | Oct. 19, 1971 |

[54] LEAKPROOF WATER SPIGOT
6 Claims, 3 Drawing Figs.

[52] U.S. Cl............................................... 251/266
[51] Int. Cl.............................................. F16k 31/50
[50] Field of Search.................................. 251/264,
266, 267, 268, 270, 271, 273; 137/625.48

[56] References Cited
UNITED STATES PATENTS
1,495,964   5/1924   Reid................................. 251/266 X
2,059,078   10/1936  Allred............................. 251/266 X
3,269,698   8/1966   Koch................................. 251/267

FOREIGN PATENTS
704,561   2/1954   Great Britain................ 251/266

*Primary Examiner*—W. Cary Nelson
*Assistant Examiner*—David R. Matthews
*Attorney*—Bacon & Thomas

ABSTRACT: The valve head is mounted in the inlet casing for reciprocation but is prevented from rotating by being fixed on the upper end of a mounting rod which has a noncircular lower end extending into a cooperating noncircular recess with a sliding, nonrotating fit. The valve stem and the valve head have cooperating threads and the valve stem is held against axial movement so that rotation of the valve stem results in reciprocation of the valve head.

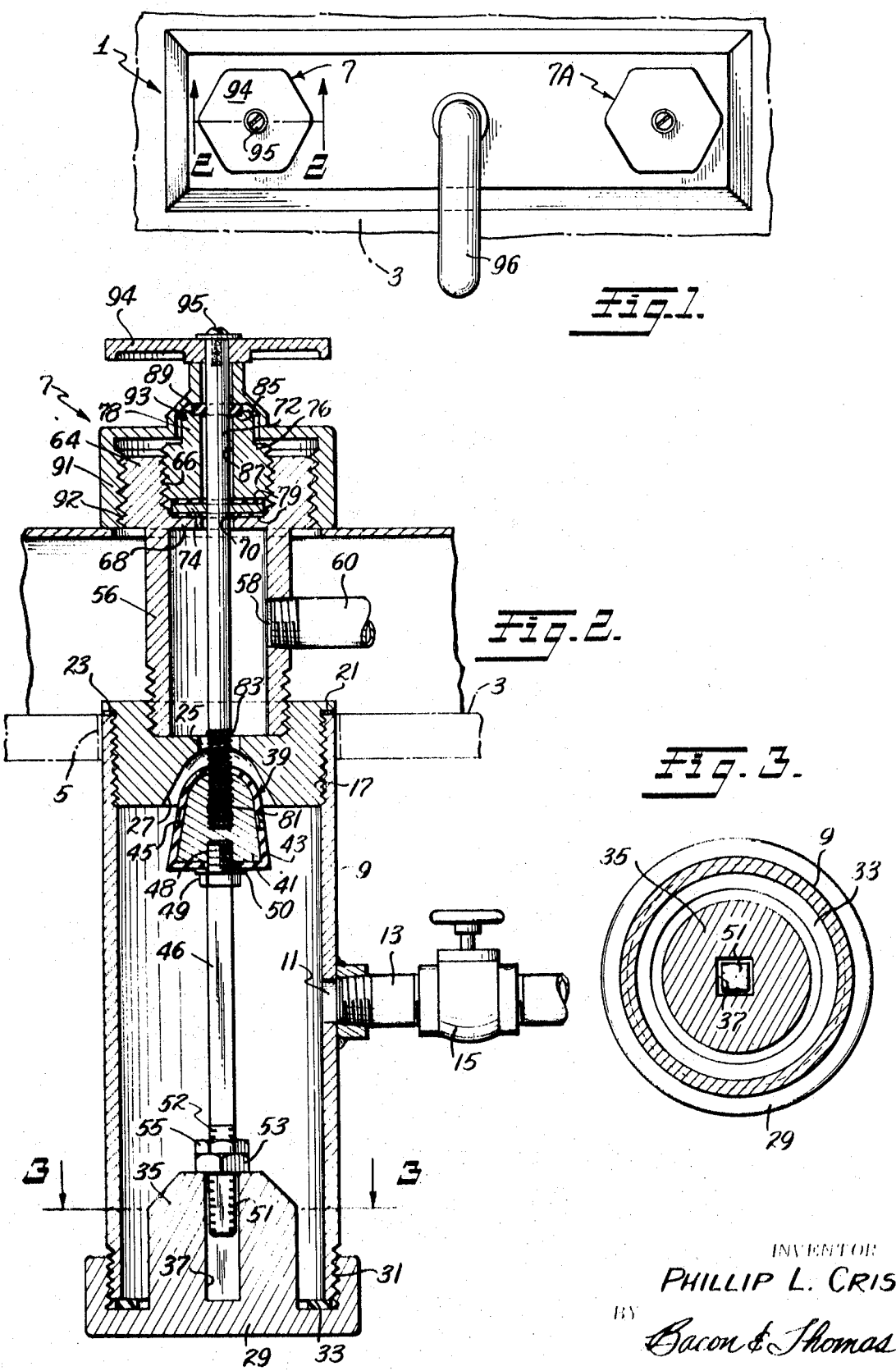

LEAKPROOF WATER SPIGOT

This invention relates to an improved leakproof water spigot for hot or cold water or for a mixing faucet wherein hot and cold water are mixed and discharged from a common outlet.

It is an object of this invention to provide a water spigot which is leakproof and has a valve head mounted on the upper end of a rod for reciprocation relative to the valve seat but held against rotation by a nonrotating, sliding fit between the rod and the valve casing.

Another object of the invention is to provide a water spigot which may be quickly and easily disassembled and assembled for repair or cleaning.

A further object is to provide a water spigot which is assembled from parts which are economical and relatively easy to manufacture.

Other objects are to provide a water spigot which is easily operated, durable for long periods of time without requiring attention or repair, and economical to manufacture.

These and other objects and advantages of the invention will become apparent from the following detailed description of a preferred embodiment of the invention illustrated in the accompanying drawings, in which:

FIG. 1 is a plan view of a mixing faucet incorporating the present water spigot;

FIG. 2 is an enlarged vertical sectional view of the water spigot taken on line 2—2 of FIG. 1; and FIG. 3 is a sectional view taken on the line 3—3 of FIG. 2.

The leakproof water spigot is adapted to be mounted on a support surface 1, such as a sink having a flat upper surface 3 and provided with an opening 5 for receiving a water spigot 7.

Each water spigot 7 includes a cylindrical casing member 9 having a water inlet opening 11 formed in the sidewall thereof and connected with a water inlet pipe 13 provided with a conventional shutoff valve 15.

The upper end of the casing member 9 is closed by a wall member 17 which is removably secured in place by the threaded connection 19 and sealed against leakage by the resilient gasket 21 positioned between the upper end of the casing member 9 and the shoulder 23 provided on the wall member 17. The wall member 17 at its central portion is provided with a flow passage 25 and on its lower surface with a valve seat 27 which is of generally conical configuration.

The lower end of the casing member 9 is closed by a removable cap member 29 threaded as at 31 to cooperating threads formed on the lower end of the casing member. A resilient gasket 33 positioned between the lower end of the casing 9 and the cap member 29 seals the lower end of the casing against leakage. The central portion 35 of the cap member 29 extends upwardly for a short distance into the interior of the casing member 9 and is provided with a square recess 37 which extends downwardly into the central portion from the upper surface thereof.

A valve head 39 is mounted in the casing 9 for cooperation with the valve seat 27 for controlling the flow of water through the passage 25. The valve head 39 is of generally conical configuration and may have a curved nose portion for cooperation with a similarly curved portion of the valve seat 27. Preferably the valve head 39 includes a metal interior body portion 41 covered by a boot 43 of resilient material such as medium soft rubber. The boot of resilient material may be molded onto the metal body 41 or the boot may be formed separately and attached to the metal body by a suitable adhesive and a plastic band 45 tightly encircling the boot 43 midway between its upper and lower end.

The valve head 39 is fixed on the upper end of a mounting rod 46 by a threaded connection 48 and is secured thereon against accidental loosening or removal therefrom by a lock nut 49 and washer 50 which bears against the boot 43 and lower surface of the valve head 39.

The lower end of the mounting rod 46 is shown to be of square configuration as viewed in transverse cross section and provided with screw threads 52 which are formed only at the corners of the square portion of the mounting rod. The square portion 51 is slightly smaller than the square recess 37 so that the mounting rod slides freely in the recess but is prevented from rotating therein. A threaded nut 53 mounted on the threads 52 is adjustable axially on the mounting rod 46 and cooperates with the upper surface of the central portion 35 for limiting downward movement of the valve head 39 with respect to the valve seat 27. A lock nut 55 also mounted on the screw threads 52 is employed in the normal manner for preventing rotation of the nut 53 from its adjusted position.

A housing member 56 having a water outlet opening 58 and a water outlet pipe 60 in the sidewall thereof, is removably secured to the upper side of the wall member 17 by the threaded connection.

The upper end of the housing member 56 is enlarged as at 64 and is provided with a threaded counterbore 66 having a bottom wall 68 formed with a central valve stem opening 70.

A valve stem 72 which has a laterally extending thrust shoulder 74 rigid therewith, extends freely through the valve stem opening 70, the housing 56 and the flow passage 25 with the thrust washer 74 disposed in the bottom of the counterbore 66. A threaded bushing member 76 provided with a noncircular neck portion 78 for receiving a wrench, is threaded into the thread 66 of the counterbore. The lower surface of the bushing member 76 cooperates with the upper surface of the bottom wall of the counterbore so as to confine the thrust shoulder 74 therebetween and prevent axial movement of the valve stem 72 while permitting rotated movement thereof. Preferably, an antifriction washer 79 formed of plastic such as nylon or other antifriction material such as bronze or other type bearing metal, is disposed on either side of the thrust shoulder 74 in order to reduce friction and to provide an arrangement which will operate easily for a long period of time without requiring further attention.

The valve head 39 is provided with a threaded recess 81 which extends downwardly from the upper end into the interior thereof and the lower end of the valve stem 72 is threaded as at 83 with threads matching those in recess 81 and is screwed into the threads of the valve head 39. The threads in the recess 81 and those on the valve stem may be of any desired pitch or they may be double or triple threads depending upon the extent to which the valve head is to be reciprocated in response to rotation of the valve stem through a given angle.

The upper end wall of the bushing member 76 is formed with a depression 85 surrounding the central passage 87 and a resilient packing member 89 seated in the depression 85 closely engages the valve stem 72.

A bonnet member 91 through which the upper end of the valve stem 72 extends, is mounted on the enlarged portion 64 of the housing member 56 by the threaded connection 92. The bonnet member 91 is formed threaded a bore 93 at the central portion thereof and the bottom wall of the bore 93 engages the upper surface of the resilient packing 89 and compresses the packing in the usual manner so that the packing provides a seal between the valve stem 72 and the bushing member 76 thereby preventing the escape of water. A handle 94 of conventional construction and configuration is fixed to the upper end of the valve stem 72 by a threaded screw 95.

It will be seen that the present water spigot is operated by rotating the handle 94 to move the valve head 39 into or out of engagement with the valve seat 27. As the threads 83 of the valve stem 72 are screwed out of the threaded recess 81 in the valve head 39, the valve head 39 will be moved downwardly and the lower end of the mounting rod 46 will slide within the square recess 37 and prevent rotation of the valve head 39. As the threads 83 are screwed into the valve head, the reverse action takes place and the valve head is drawn up into the valve seat 27 and further urged against the valve seat by the pressure of the water in the casing member 9 acting on the lower surface of the valve head.

In order to provide a mixing faucet, a water spigot similar to the one just described and designated in FIG. 1 as 7A, is connected to the water outlet pipe 60 and a discharge nozzle 96 is connected with the outlet pipes 60 for discharging water from one or both of the spigots.

While a preferred form of my invention has been shown and described, it will be understood that such modifications and alterations as will occur to those skilled in the art may be made without departing from the teaching of this invention as fall within the scope of the appended claims.

What I claim is:

1. A leakproof water spigot, comprising: a wall member; a casing member provided with a water inlet removably mounted on one side of said wall member; a cap member removably mounted on said casing member and having a noncircular recess therein opening toward said wall member; a housing member provided with a water outlet, removably mounted on the other side of said wall member, said wall member having a flow passage extending therethrough connecting the interior of the casing with the interior of the housing; a valve seat for said passage carried by the wall member on said one side, a valve head in said chamber having a threaded opening therein and cooperating with said valve seat for controlling the flow of water through said passage; means mounting said valve head for reciprocation while preventing rotation thereof, said mounting means comprising a mounting rod rigidly secured at one end thereof to said valve head, the other end of said mounting rod having the same transverse noncircular configuration as said recess and extending into said recess with a sliding, nonrotating fit; and adjustable means carried by said mounting rod and cooperating with said cap member for limiting the extent of movement of the valve head away from the valve seat; the upper end of said housing having a threaded counterbore therein defining a bottom thrust wall provided with a central opening; a valve stem extending through housing and having a threaded end engaged in the threads of the valve head; a thrust shoulder rigid with the valve stem and seated in the counterbore; a threaded bushing member mounted in the threaded counterbore confining said thrust shoulder between itself and said bottom thrust wall against axial movement while permitting rotation thereof and of said valve stem; and sealing means disposed between the upper end of said bushing member and the valve stem.

2. A leak proof water spigot according to claim 1 in which a threaded bonnet member is mounted on the upper threaded end of the housing and encloses in a bore formed therein, the upper end of the bushing member, said sealing means comprising a resilient, annular packing surrounding the valve stem and confined between bottom wall of the bore in the bonnet member and the top wall of the bushing member.

3. A leak proof water spigot according to claim 1 in which a washer having a low coefficient of friction is disposed in said counterbore and on either side of said thrust shoulder.

4. A leakproof water spigot according to claim 3 in which said washers are composed of nylon.

5. A leakproof water spigot according to claim 1 in which the valve had comprises a metal core, and a boot of medium soft rubber encloses said core.

6. A leakproof water spigot according to claim 5 in which said valve seat and the portion of the valve head which cooperates with said valve seat are of generally frustoconical configuration.